3,086,918
ISOLEUCINE FERMENTATION
Ichiro Chibata, Toyonaka, Masahiko Kisumi, Motoyama-cho, Higashinada-ku, Kobe, Yoshitaro Ashikaga, Toyonaka, and Joji Kato, Higashiyodogawa-ku, Osaka, Japan, assignors to Tanabe Seiyaku Co., Ltd., Osaka, Japan
No Drawing. Filed Oct. 10, 1961, Ser. No. 144,024
Claims priority, application Japan Oct. 19, 1960
5 Claims. (Cl. 195—47)

This invention relates to a process for producing L-isoleucine which is an essential amino acid of commercial importance. Many naturally occurring proteins contain appreciable quantities of L-isoleucine. To isolate L-isoleucine from protein, the protein is hydrolyzed and L-isoleucine is separated from the other amino acids which are liberated by the hydrolysis. While chemical synthesis has been applied to the preparation of isoleucine, the product obtained is always the mixture of DL-isoleucine and DL-allisoleucine and it is necessary to subject the product to separation and resolution processes which are difficult and expensive in order to provide L-isoleucine.

It has been reported that when cultivating certain strains of bacteria on a medium containing L-threonine, a portion of the L-threonine that is supplied in the medium is converted to L-isoleucine. However, in the presence of the latter, this conversion is substantially inhibited. Therefore, appreciable quantities of L-isoleucine is not accumulated in the medium.

We have found that, however, when D-threonine is supplied in the medium instead of L-threonine, appreciable quantities of L-isoleucine is accumulated without interference by L-isoleucine formed.

According to this invention, L-isoleucine is produced by fermenting on a nutrient medium containing D-threonine, carbohydrates and organic nitrogen sources with a bacteria selected from the group consisting of *Serratia marcescens*, *Pseudomonas aeruginosa* and *Pseudomonas fluorescens*. A medium which we have found to be suitable for use in this invention is one containing 1 to 5% of D-threonine 2 to 15% of glucose and 0.5 to 2% of organic nitrogen source, such as cornsteep liquor, chlorella powder, peptone, yeast extract, meat extract or urea.

We have found that the use of inorganic ammonium salts is optional in this case, however, the addition of 0.2 to 2% of an ammonium salt, such as chloride, phosphate or sulfate, to the medium is preferred. Mineral salts, such as potassium phosphate, magnesium sulfate or calcium carbonate, may be added to the medium, if necessary. It has been discovered that the pH should be maintained within a range of 6 to 9 during the fermentation. It has also been discovered that the fermentation should be carried out at a temperature of 25° to 37° C. for 1 to 4 days with vigorous shaking.

Following this fermentation, the isoleucine is then purified by filtration of the fermentative broth, absorption of the isoleucine on a strong cation exchange resin, such as the sulfonic acid resins, Dowex–50 or Amberlite IR–120, elution of the isoleucine from the cation exchange resins by dilute alkali, such as ammonium hydroxide or sodium hydroxide, passage of this eluate through a weak cation exchange resin, such as the carboxylic resin, Amberlite IRC–50, which will not absorb the isoleucine, and concentration of the effluent. Additional purification is then carried out by a standard method of recrystallization. The following examples are given solely for the purpose of illustration and are not to be construed as limitations of this invention, many variations of which are possible without departing from the spirit or scope thereof.

Example 1

An aqueous fermentation medium having the following composition was prepared.

| | Percent |
|---|---|
| D-threonine | 2 |
| Glucose | 10 |
| Chlorella powder | 1 |
| $K_2HPO_4$ | 0.1 |
| $MgSO_4 \cdot 7H_2O$ | 0.05 |
| Urea | 0.5 |
| $CaCO_3$ | 2 | pH adjusted to 7.0 with sodium hydroxide.

15 ml. of this medium was added to the shaking flask (500 ml. capacity) and was sterilized by autoclaving for 10 minutes at 2 atm. pressure. Then the medium was inoculated with a loopful of a culture of *Serratia marcescens*. The cultivation was carried out at 30° C. with shaking. After 24 hours, the broth was assayed as having an L-isoleucine content of 8.5 mg./ml.

Example 2

An aqueous fermentation medium having the following composition was prepared.

| | Percent |
|---|---|
| D-threonine | 2 |
| Glucose | 10 |
| Cornsteep liquor | 2.2 |
| $K_2HPO_4$ | 0.1 |
| $MgSO_4 \cdot 7H_2O$ | 0.05 |
| $CaCO_3$ | 2 | pH adjusted to 7.0 with sodium hydroxide.

2.5 ml. of this medium was added to the shaking flask (500 ml. capacity) and was sterilized by autoclaving for 10 minutes at 2 atm. pressure. Then the medium was inoculated with two loopfuls of a culture of *Serratia marcescens*. The cultivation was carried out at 30° C. with shaking. After 48 hours, the broth was assayed as having an L-isoleucine content of 6 mg./ml.

Example 3

An aqueous fermentation medium having the following composition was prepared.

| | Percent |
|---|---|
| D-threonine | 2 |
| Glucose | 10 |
| Cornsteep Liquor | 2 |
| $K_2HPO_4$ | 0.1 |
| $MgSO_4 \cdot 7H_2O$ | 0.05 |
| Urea | 1 |
| $CaCO_3$ | 2 | pH adjusted to 7.0 with sodium hydroxide.

25 ml. of this medium was added to the shaking flask (500 ml. capacity) and was sterilized by autoclaving for 10 minutes at 2 atm. pressure. Then the medium was inoculated with two loopfuls of a culture of *Pseudomonas aeruginosa*. The cultivation was carried out at 30° C. with shaking. After 48 hours the broth was assayed as having an L-isoleucine content of 5.5 mg./ml.

Example 4

An aqueous fermentation medium having the following composition was prepared.

| | Percent |
|---|---|
| D-threonine | 1 |
| Glucose | 5 |
| Peptone | 0.5 |
| Yeast extract | 0.5 |
| $K_2HPO_4$ | 0.1 |
| $MgSO_4 \cdot 7H_2O$ | 0.05 |
| Urea | 1 |
| L-aspartic acid | 1 |
| $CaCO_3$ | 2 | pH adjusted to 7.0 with sodium hydroxide.

25 ml. of this medium was added to the shaking flask (500 ml. capacity) and was sterilized by autoclaving for 10 minutes at 20 atm. pressure. Then the medium was inoculated with two loopfuls of a culture of *Pseudomonas fluorescens*. The cultivation was carried out at 30° C. with shaking. After 72 hours, the broth was assayed as having an L-isoleucine content of 4 mg./ml.

We claim:

1. A process for producing L-isoleucine which comprises fermenting on a nutrient medium containing D-threonine, carbohydrates and organic nitrogen sources with a bacteria selected from the group consisting of *Serratia marcescens*, *Pseudomonas aeruginosa* and *Pseudomonas fluorescens*.

2. A process for producing L-isoleucine which comprises fermenting on a nutrient medium containing D-threonine, carbohydrates and organic nitrogen sources with a bacteria selected from the group consisting of *Serratia marcescens*, *Pseudomonas aeruginosa* and *Pseudomonas fluorescens* at a temperature of 25° to 37° C. for 1 to 4 days while maintaining the pH of the medium near neutrality.

3. A fermentation process for producing L-isoleucine which comprises culturing *Serratia marcescens* in a nutrient medium containing D-threonine, carbohydrate and organic nitrogen.

4. A fermentation process for producing L-isoleucine which comprises culturing *Pseudomonas aeruginosa* in a nutrient medium containing D-threonine, carbohydrate and organic nitrogen.

5. A fermentation process for producing L-isoleucine which comprises culturing *Pseudomonas fluorescens* in a nutrient medium containing D-threonine, carbohydrate and organic nitrogen.

References Cited in the file of this patent

Horvath et al.: Journal of Bacteriology, 78, 293 (1959), Williams & Wilkens Co., Baltimore.